(12) United States Patent
Hettstedt et al.

(10) Patent No.: US 7,945,170 B2
(45) Date of Patent: May 17, 2011

(54) METHOD AND SYSTEM FOR OPTICAL TRANSMISSION SIGNAL LEVEL CONFIGURATION

(75) Inventors: Heinz-Dieter Hettstedt, Isernhagen (DE); Axel Schröder, Nordsehl (DE); Gerd Klauke, Hannover (DE); Alexander Thomas, Hannover (DE)

(73) Assignee: Alcatel Lucent, Paris (FR)

( * ) Notice: Subject to any disclaimer, the term of this patent is extended or adjusted under 35 U.S.C. 154(b) by 849 days.

(21) Appl. No.: 11/751,365

(22) Filed: May 21, 2007

(65) Prior Publication Data

US 2008/0056725 A1    Mar. 6, 2008

(30) Foreign Application Priority Data

May 22, 2006  (EP) ..................... 06290827

(51) Int. Cl.
*H04B 10/18*   (2006.01)
(52) U.S. Cl. .................. 398/158; 398/192; 398/210
(58) Field of Classification Search .............. 398/147, 398/158–159, 192, 210
See application file for complete search history.

(56) References Cited

U.S. PATENT DOCUMENTS

| | | | | |
|---|---|---|---|---|
| 5,077,728 A | * | 12/1991 | Kaminow | ................ 398/89 |
| 5,267,071 A | * | 11/1993 | Little et al. | ................ 398/162 |
| 5,321,849 A | | 6/1994 | Lemson et al. | |
| 5,615,034 A | | 3/1997 | Hori et al. | |
| 5,689,355 A | | 11/1997 | Okubo et al. | |
| 6,490,063 B1 | | 12/2002 | Imajo | |
| 6,980,739 B1 | | 12/2005 | Hong | |
| 2003/0002110 A1 | * | 1/2003 | Schemmann et al. | ...... 359/154 |
| 2004/0037565 A1 | | 2/2004 | Young et al. | |

FOREIGN PATENT DOCUMENTS

JP    4-469023    *   9/1992

* cited by examiner

*Primary Examiner* — Leslie Pascal
(74) *Attorney, Agent, or Firm* — Fay Sharpe LLP

(57) ABSTRACT

The invention relates to an optical transmission system comprising transmitter and receiver devices and comprising automatic optical signal level configuration means which provide the same fixed output signal level for a received signal level range, and the system comprising at least one automatic self-level unit in the transmitter device and at least one automatic self-level unit in the receiver device.

8 Claims, 2 Drawing Sheets

DL

UL

METHOD AND SYSTEM FOR OPTICAL TRANSMISSION SIGNAL LEVEL CONFIGURATION

BACKGROUND OF THE INVENTION

The invention is based on the priority application EP 06290827.2 which is hereby incorporated by reference.

The present invention relates generally to optical transmission systems and more particularly to a method and system for optical transmission signal level configuration.

Radio frequency RF communications systems, e.g. in building and in tunnels, which are distributed over large distances, typically use an optical fibre transport network due to the great advantage of the low loss characteristics of the optical fibers.

FIG. 1 shows a block diagram of a typical RF communications system with analogue optical transport network in downlink DL and uplink UL direction. In downlink DL an RF signal RFi is provided to a transmitter device TX1 in charge of adapting the signal to be transmitted in optical form, over an optical fibre link OF1, to a receiver device RX1, which receives the optical signal and provides the corresponding RF output signal RFo. The optical transport network transmitter device TX1 comprises a variable attenuator AT1 to limit the signal level at the input of an optical transmitter OTx1 which typically comprises a laser and sometimes also a pre-amplifier. On the other side of the optical fiber, the receiver device RX1 comprises an optical receiver ORx1 followed by another variable attenuator AT2 which provides the desired signal level to a power amplifier PA1. In uplink direction UL, an RF signal RFi' is provided to a transmitter device TX2 in charge of adapting the signal to be transmitted in optical form, over an optical fibre link OF2, to a receiver device RX2, which receives the optical signal and provides the corresponding RF output signal RFo'. The optical transmitter device TX2 comprises a power amplifier PA2 followed by a variable attenuator AT3 which provides a fixed signal level at the input of the optical transmitter OTx2. On the other side of the optical fiber, the receiver device RX2 comprises an optical receiver ORx2 followed by another variable attenuator AT4 which provides the desired signal level to a determined input 3 of a signal combiner RC. The signal combiner RC comprises more inputs 1, 2, 4 intended for other uplink optical links (not shown) parallel to the one shown in the example of the figure.

The variable attenuators AT1 to AT3 are placed in the optical network in order to avoid signal distortion from overdrive of the optical transmitters OTx1, OTx2 and power amplifier PA1 by too large signal levels. In the uplink UL, the attenuator AT4 provides a fixed signal level to a certain input 3 of the combiner RC so that at the output of the combiner RC a predetermined fixed signal level (the sum of the different uplink optical signals) is achieved and all output signals of the parallel optical links can be set to the same level.

A problem with the known analogue optical system described above is that for network commissioning, i.e. to put the optical network ready for service, or for maintenance or failure network test, the optical network attenuators AT1 to AT4 shall be, each time, set to the optimum level so that the signal at their output has a determined value. This is done, for example, in downlink DL as well as in uplink UL, by providing a source S1, S2 signal to the optical network, reading the signal level at the output of the attenuator, the power amplifier PA1 and/or the combiner RC e.g. by means of a signal monitoring equipment AN1 to AN4, and setting the attenuators to the needed level. To perform the steps above, a number of human personnel is needed to provide a signal source, to go to the place the attenuators AT1 and AT4 are located, connect and read the monitoring equipment AN1 to AN4 and manually leveling the attenuators. If we take in consideration that such optical network systems are distributed over large areas with long distances between locations of signal input and output, it is clear that a lot of human effort is needed and some practical problems may arise when the system is installed in a number of tunnels or in great buildings e.g. locating the attenuators, and communication between personnel. An alternative to avoid much human personnel would be to provide in a single place with display information about the source signal S1 and S2, the signal at the output of the attenuators AT1 to AT4 and means to remotely actuate on the attenuators to set them to the optimum level. The latter could be done with a single person but would increase the complexity and cost of the optical network and in any case, variations of the optical network system and system parameters e.g. such as the number of RF carriers needs interaction and adjustment.

SUMMARY OF THE INVENTION

It is the object of the present invention to provide an improved method and system for optical transmission which reduces the need for network commissioning and testing.

The object is achieved by an optical transmission system comprising transmitter and receiver devices and comprising optical signal level configuration means, wherein said signal level configuration means are automatic self-level units which provide the same fixed output signal level for a received signal level range, and the system comprises at least one automatic self-level unit in the transmitter device and at least one automatic self-level unit in the receiver device.

The object is further achieved by a method for optical transmission signal level configuration in an optical transmission system comprising transmitter and receiver devices, the method comprising providing at least one automatic self-level unit in the transmitter device and at least one automatic self-level unit in the receiver device, the automatic self-level units providing a determined fixed output signal level for a range of received signal level values.

The optical network according to the invention comprises a combination of automatic self-leveling units in order to provide an automatic self-leveling functionality over the whole network structure. For this purpose, in the uplink and downlink direction, the system comprises at least one automatic self-leveling unit in the transmitter and receiver devices. The dynamic range of the automatic self-leveling units and their reaction time can be initially adjusted to each other so that the whole system operates in a balanced way providing defined signal levels at the input of the optical transmitters, amplifiers or combiners.

By using the automatic self-leveling units according to the invention the system provides, in uplink and downlink direction, a constant composite signal level at the desired places independently, within a certain dynamic range, of the number of carriers used or the input power levels. The automatic self-leveling units can also compensate for signal losses caused by the optical fiber link or optical devices aging effects. With such an arrangement then, within a certain signal range at the input of the self-leveling units, no commission and testing effort is necessary every time a network parameter is changed e.g. a new signal carrier is introduced, or aging and temperature effects cause a signal loss or gain. Once the optical network has been installed and set into operation, costly monitoring equipment and maintenance personnel for commissioning and testing can be saved.

Further advantageous configurations of the invention emerge from the dependent claims, the following description and the drawings.

BRIEF DESCRIPTION OF THE DRAWING

An embodiment example of the invention is now explained with the aid of FIGS. 1 and 2.

DETAILED DESCRIPTION OF THE DRAWINGS

Figure 1:
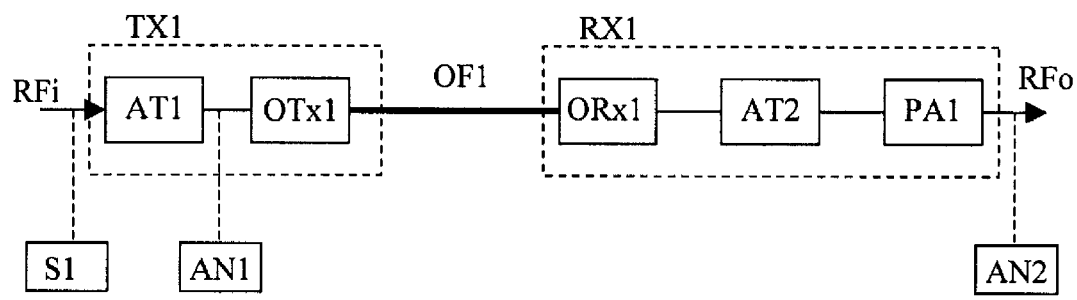
FIG. 1 shows a simplified block diagram of a conventional RF communications system using an optical transport network.
Figure 1:
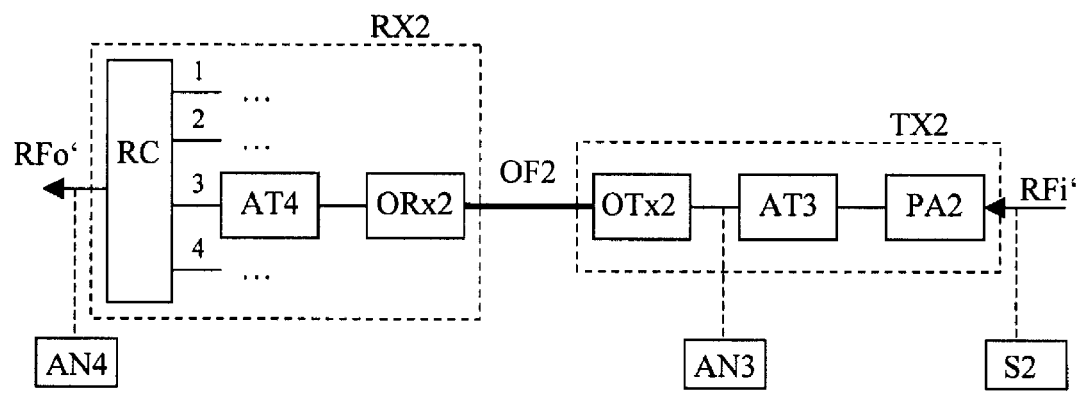
Figure 2:
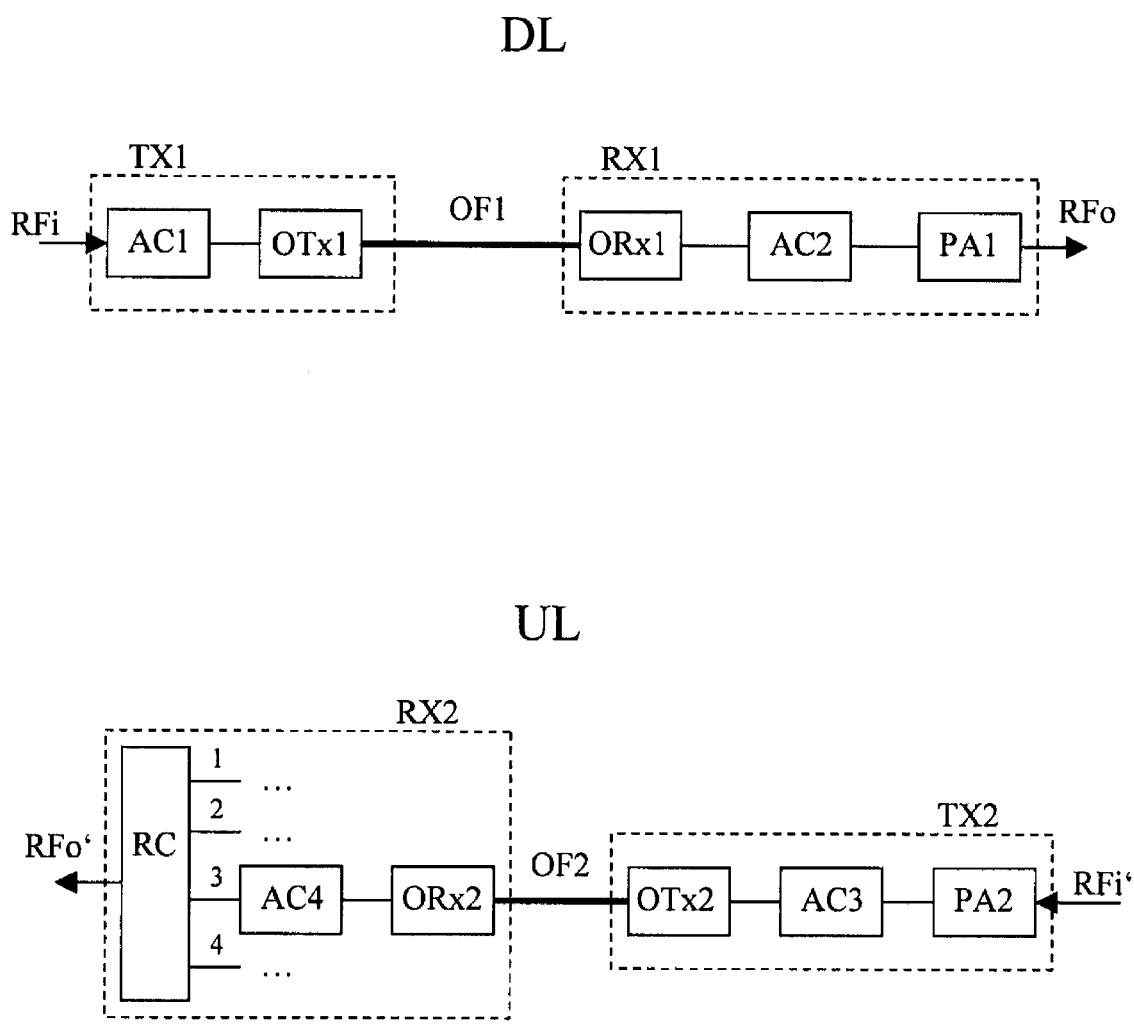
FIG. 2 shows a simplified block diagram of an RF communications system comprising an optical transport network according to the invention.

FIG. 2 shows an RF communications system using an optical transport network according to FIG. 1 in which the variable attenuators AT1 to AT4 have been replaced by automatic self-leveling units AC1 to AC4. In downlink DL, an automatic self-leveling unit AC1 in the transmitter device TX1 provides a constant composite signal level to an optical transmitter OTx1 independently of the RF signal RFi level provided to the transmitter device TX1. For example, the RF signal RFi provided to the transmitter device may comprise one or more carrier signals, and every time a carrier is added or removed the signal level increases or decreases and the automatic self-leveling unit AC1 compensates for these signal level changes within a certain signal range. On the other side of the optical fiber OF1, the receiver device RX1 comprises another automatic self-leveling unit AC2 which provides a constant composite signal level to a power amplifier PA1 independently of the signal level given by the optical receiver ORx1.

The same automatic self-leveling functionality AC3 and AC4 is also introduced in the transmitter and receiver devices TX2, RX2 of an uplink optical connection. In the uplink direction UL it is advantageous if all the optical parallel links connected to the signal combiner RC provide the same defined output level at the input ports 1 to 4 of the signal combiner.

The automatic self-leveling units AC1 to AC4 allow the optical network system to operate, within a certain dynamic signal range according to the limitations of such devices, independently of a) the RF signal RFi level provided to the transmitter devices TX1, TX2 and b) the losses of the optical fiber links OF1, OF2, which are the main parameters requiring signal level adjustment.

What is claimed is:

1. An optical transmission system comprising transmitter and receiver devices and comprising optical signal level configuration means, wherein said signal level configuration means are automatic self-level units which provide the same fixed output signal level for a received signal level range, and the system comprising at least one automatic self-level unit in the transmitter device and at least one automatic self-level unit in the receiver device, and at least two parallel optical links in the uplink direction connected to a signal combiner, each optical link providing the same defined output level at the input of the signal combiner.

2. The optical transmission system of claim 1, wherein the automatic self-level unit of the transmitter device is adapted to compensate at least for different signal levels provided to said transmitter device and the automatic self-level unit of the receiver device is adapted to compensate at least for optical fiber signal attenuation.

3. The optical transmission system of claim 2, wherein the signal provided to the transmitter device is a radio frequency signal with one or more carriers.

4. The optical transmission system of claim 2, wherein the automatic self-level units are further adapted to compensate for signal variations due to optical device aging and/or temperature effects.

5. A method for optical transmission signal level configuration in an optical transmission system comprising transmitter and receiver devices, the method comprising providing at least one automatic self-level unit in the transmitter device and at least one automatic self-level unit in the receiver device, the automatic self-level units providing a determined fixed output signal level for a range of received signal level values and further providing automatic leveling of at least two parallel optical links in the uplink direction so that they provide the same defined output level.

6. The method for optical transmission signal level configuration of claim 5, wherein the automatic self-level unit of the transmitter device is set to compensate at least for different signal levels provided to said transmitter device and the automatic self-level unit of the receiver device is set to compensate at least for optical fiber signal attenuation.

7. The method for optical transmission signal level configuration of claim 6, wherein the signal provided to the transmitter device is a radio frequency signal comprising one or more carriers.

8. The method for optical transmission signal level configuration of claim 6, wherein the automatic self-level units are further set to compensate for signal variations due to optical device aging and/or temperature effects.

\* \* \* \* \*